US009126864B2

(12) United States Patent
Shah

(10) Patent No.: US 9,126,864 B2
(45) Date of Patent: Sep. 8, 2015

(54) DURABLE CONCRETE AND METHOD FOR PRODUCING THE SAME

(71) Applicant: NAVS, LLC, Midlothian, VA (US)

(72) Inventor: Ashok H. Shah, Midlothian, VA (US)

(73) Assignee: NAVS, LLC, Midlothian, VA (US)

( * ) Notice: Subject to any disclaimer, the term of this patent is extended or adjusted under 35 U.S.C. 154(b) by 0 days.

(21) Appl. No.: 14/540,987

(22) Filed: Nov. 13, 2014

(65) Prior Publication Data

US 2015/0068430 A1    Mar. 12, 2015

Related U.S. Application Data

(62) Division of application No. 14/078,327, filed on Nov. 12, 2013, now Pat. No. 8,915,997.

(60) Provisional application No. 61/823,962, filed on May 16, 2013.

(51) Int. Cl.

| C04B 16/08 | (2006.01) |
|---|---|
| C04B 20/00 | (2006.01) |
| C04B 38/00 | (2006.01) |
| C08K 7/22 | (2006.01) |
| C04B 16/06 | (2006.01) |
| C04B 14/24 | (2006.01) |
| C04B 28/02 | (2006.01) |
| C04B 14/30 | (2006.01) |
| C04B 18/08 | (2006.01) |
| C04B 111/20 | (2006.01) |

(52) U.S. Cl.
CPC .............. *C04B 20/002* (2013.01); *C04B 14/24* (2013.01); *C04B 14/301* (2013.01); *C04B 16/0633* (2013.01); *C04B 16/0641* (2013.01); *C04B 18/082* (2013.01); *C04B 20/004* (2013.01); *C04B 20/0056* (2013.01); *C04B 28/02* (2013.01); *C04B 2111/29* (2013.01); *Y02W 30/92* (2015.05); *Y02W 30/94* (2015.05)

(58) Field of Classification Search
CPC .......................... C04B 20/002; C04B 20/0028
See application file for complete search history.

(56) References Cited

U.S. PATENT DOCUMENTS

| 4,002,482 A | 1/1977 | Coenen |
|---|---|---|
| 4,057,526 A | 11/1977 | de Rook |
| 4,111,713 A | 9/1978 | Beck |
| 4,393,901 A | 7/1983 | Beck |
| 4,448,599 A | 5/1984 | Mackenzie et al. |
| 5,062,897 A | 11/1991 | Katsumata et al. |
| 5,660,624 A | 8/1997 | Dry |
| 5,783,297 A | 7/1998 | Wise et al. |
| 6,084,011 A | 7/2000 | Lucero et al. |
| 6,261,360 B1 | 7/2001 | Dry |
| 6,485,560 B1 | 11/2002 | Scherer et al. |
| 6,733,583 B2 | 5/2004 | Frailey et al. |
| 7,288,147 B2 | 10/2007 | Christensen et al. |
| 7,648,575 B2 | 1/2010 | Kerns et al. |
| 7,922,808 B2 | 4/2011 | Brower et al. |
| 7,922,809 B1 | 4/2011 | Constantz et al. |
| 8,038,790 B1 * | 10/2011 | Dubey et al. ................. 106/675 |
| 8,039,521 B2 | 10/2011 | Schattka et al. |
| 8,177,904 B2 | 5/2012 | Einfeldt et al. |
| 8,361,219 B2 | 1/2013 | Just et al. |
| 2003/0110984 A1 | 6/2003 | Scherer et al. |
| 2005/0098317 A1 | 5/2005 | Reddy et al. |
| 2005/0274285 A1 | 12/2005 | Christensen et al. |
| 2005/0274294 A1 | 12/2005 | Brower et al. |
| 2006/0147681 A1 | 7/2006 | Dubey |
| 2006/0288909 A1 | 12/2006 | Naji et al. |
| 2007/0125271 A1 | 6/2007 | Barlet-Gouedard et al. |
| 2007/0193478 A1 | 8/2007 | Schattka et al. |
| 2007/0196655 A1 | 8/2007 | Schattka et al. |
| 2008/0157428 A1 | 7/2008 | Utagaki et al. |
| 2008/0227891 A1 | 9/2008 | Jarvie et al. |
| 2008/0275149 A1 | 11/2008 | Ladely et al. |
| 2009/0078162 A1 | 3/2009 | Clausi et al. |
| 2009/0099271 A1 | 4/2009 | Einfeldt et al. |
| 2009/0124728 A1 | 5/2009 | Kerns et al. |
| 2010/0024368 A1 | 2/2010 | Briot et al. |
| 2010/0242802 A1 | 9/2010 | Gleeson et al. |
| 2011/0303123 A1 | 12/2011 | Naji et al. |
| 2012/0197547 A1 | 8/2012 | Ong et al. |
| 2013/0133553 A1 | 5/2013 | Fernald |
| 2013/0280364 A1 | 10/2013 | Ong et al. |
| 2013/0281556 A1 | 10/2013 | Ong et al. |

FOREIGN PATENT DOCUMENTS

WO          03/087010 A1      10/2003

OTHER PUBLICATIONS

"The use of pozzolans in concrete". The Concrete Countertop Institute. Oct. 23, 2011 [Retrieved on Jun. 13, 2014]. Retrieved from http://www .concretecou ntertopinstitute.com/blog/20 11/1 0/the-use-of -pozzolans-in-concrete.
"Sphere One Extendoshperes XOL-150 Hollow Spheres". MatWeb. Apr. 10, 2014 [Retrieved on Apr. 10, 2014] Retrieved from <http://www.matweb.com/search/datasheet.aspx?matguid=5c8307d8d2684ccc9e5a47777ec945da>.
"Densities of some Common Materials". Engineering Toolbox. Apr. 10, 2014 [Retrieved on Apr. 10, 2014] Retrieved from http://www.engineeringtoolbox.com/densitymaterials-d 1652.html.
"Concrete Properties". Engineering Toolbox. Apr. 10, 2014 [Retrieved on Apr. 10, 2014] Retrieved from http://www.engineeringtoolbox.com/concrete-propertiesd1223.html.
"Density, Fiber Length, and Yields of Pulp for Various Species of Wood". United States Department of Agriculture. Forest Service. Sep. 1953. Retrieved from http://www.fpl.fs.fed.us/documnts/fpltn/fpltn-191-1953.pdf.
"Sodium Hydroxide". Chemical Handbook. Apr. 10, 2014 [Retrieved on Apr. 10, 2014] Retrieved from http://www.chemicalbook.com ChemicaiProductProperty_EN_CB81 05015.htm.
International Search Report and Written Opinion of PCT/US14/38175 mailed Sep. 11, 2014.
"Kinetics of Ice Growth in Cement and Concrete", Rilem, Jun. 15, 2009 <URL: http://www.rilem.org/gene/main.php? base=500218 &id_publication=62&id_papier=2432>.

* cited by examiner

*Primary Examiner* — Kaj K Olsen
*Assistant Examiner* — Karam Hijji
(74) *Attorney, Agent, or Firm* — Roberts Mlotkowski Safran & Cole, P.C.

(57) ABSTRACT

A concrete mix for producing freeze-thaw durable concrete having enhanced strength properties, like compressive strength, abrasion resistance, impact strength, toughness, is disclosed. The novel concrete mix contains deformable solid elements in place of 4-8% entrained air for good durability of concrete under freeze-thaw cycles.

12 Claims, No Drawings

DURABLE CONCRETE AND METHOD FOR PRODUCING THE SAME

CROSS REFERENCE TO RELATED APPLICATION

This application is a Divisional of application Ser. No. 14/078,327, filed on Nov. 12, 2013, and claims benefit of Provisional Application No. 61/823,962, filed May 16, 2013. The entire contents of each are hereby incorporated by reference in their entirety.

FIELD OF THE INVENTION

This invention relates to improved concrete and finished articles comprised of improved concrete. In particular, the invention relates to concrete mix containing deformable solid elements and the resulting concrete suitable for freezing environments.

BACKGROUND OF THE INVENTION

Concrete mix is comprised of mainly Portland cement, aggregates (gravel, sand), water and admixtures. A chemical reaction between cement and water forms hydrated cement paste (referred to as cement gel) that when hardened binds the aggregates together to give concrete its characteristic strength.

The porosity of hydrated cement gel consists of two types of pores: gel pores and capillary pores. For water-to-cement weight ratios at or below 36%, the porosity of cement gel is due to the porosity of hydrated cement gel. At water-to-cement weight ratios above 36%, the porosity of hydrated/hardened cement gel becomes partly due to the cement gel, and partly space not filled by the cement gel; that which is left behind by unused water upon evaporation, called "capillary pores". The higher the initial water-to-cement weight ratio above 36%, the greater the capillary pores volume.

The cement gel pores are very small (0.0005-0.01 micrometers). Water in such small pores, below 0.0033 micrometers, cannot freeze down to temperatures as low as −40° C. On the other hand, since capillary pores are much larger (0.02-10 micrometers), the water in these capillary pores freezes quite easily. Water freezing in the capillary pores expands and if the expansion is not adequately relieved, it can cause excessive stress to the walls of cement gel pores and cause the brittle cement gel pore walls to break (typical tensile strength of cement gel is about 1000 psi), causing deterioration of the concrete over repeated freeze-thaw cycles.

Widely practiced water-to-cement weight ratios in wet concrete mix are 40-60% (generally 40-50%) for good workability of wet concrete mix, but when the water-to-cement weight ratio is greater than 36%, the subsequently hardened concrete exhibits poor durability under freeze-thaw cycles. In order to ameliorate this problem, the conventional practice is to entrain about 4-8% by volume air in the wet concrete mix, for making the resulting hardened concrete more durable under freeze-thaw cycles.

Entrained air in a wet concrete mix is in the form of well-dispersed air bubbles and is achieved by adding special chemical admixtures, known as Air Entraining Agents (AEA), in the wet concrete mix. AEAs are generally comprised of wetting agents, surfactants, and/or foaming agents. The entrained air bubbles provide space for accommodating expansion of water freezing in the capillary pores, thus preventing the walls of the cement gel pores from experiencing excessive stress that could cause cement gel walls to crack. An entrained air content of about 4-8% by volume in the conventional concrete matrix corresponds to about 16-32% by volume in the cement gel (assuming the most common value of about 25% cement gel volume in concrete matrix). This is a huge volume fraction of a non-strength-contributing factor in the concrete matrix (cement gel).

Entrained air bubbles produced by AEAs can have a wide dimension distribution and maximum air bubble dimension, such as from 10-1000 micrometers (e.g., 90% of air bubbles of dimension above 300 micrometers, as reported in "Investigation into Freezing-thawing Durability of Low Permeability Concrete with or without Air Entraining Agent", June 2009, National Pavement Concrete Center, Iowa State University, Ames, Iowa). The entrained air bubbles accommodate expansion of water freezing in capillary pores. Typically, the tensile strength of a cement gel is about 1000 psi, but water freezing in capillary pores can travel up to 550 micrometers under 1000 psi of pressure generated by the expansion of the freezing water.

Accordingly, the American Concrete Institute recommends spacing between air bubbles (also termed the Spacing Factor) of no more than 200 micrometers for entrained air bubbles to be effective in making concrete freeze-thaw durable. In addition, because of the very large dimension distribution of entrained air bubbles, including air bubble dimensions as high as 1000 micrometers, the specific surface area of entrained air bubbles is recommended to be greater than 20 $mm^2/mm^3$, in combination with a Spacing Factor of 200 micrometers, as recommended by ACI (specific surface area is calculated as total surface area of entrained air bubbles divided by total volume of entrained air bubbles).

Although these conventional freeze-thaw durable concrete mixes provide good freeze-thaw durable concrete, the entrained air negatively impacts the compressive strength of concrete in a significant manner, reducing compressive strength of the concrete by about 5% for every 1% increase in entrained air (reference: *US Army Corps of Engineers Report No. ERDC/CRREL TR*-02-5, February 2002). The loss in compressive strength of concrete due to entrained air is of significant concern in case of high strength concrete. High strength concrete is often made with silica-fumes and water-to-cement weight ratios below 40%. Such concrete without entrained air has shown very high initial compressive strength, but exhibits low durability under freeze-thaw cycles for water-to-cement weight ratios as low as 36%. High strength concrete using silica fumes and water-to-cement weight ratios of about 25% can exhibit very high strength as well as high freeze-thaw durability. However, it is virtually impossible to make such low water content concrete mixes consistently, as outlined in the above referenced *US Army Corps of Engineers Report No. ERDC/CRREL TR*-02-5. There are many factors that are difficult to control affecting air bubble dimension distribution and average bubble dimension, for example the nature of the admixtures used, their compatibility with other ingredients in the concrete mix, the types of cement and aggregates, water quality parameters like hardness, environmental conditions, etc., which makes air entrained concrete noticeably variable in performance-in-place.

The presence of large air bubbles and a large volume fraction of air in the cement gel have a pronounced negative synergistic effect on strength properties of such concrete. For example, *US Army Corps of Engineers Report No. ERDC/CRREL TR*-02-5 reports a 5% decrease in compressive strength of concrete for each 1% increase in entrained air content. Said synergistic effect can also reduce other strength-related properties of hardened concrete, like abrasion resistance, toughness, impact strength, and thus, reduce the overall durability of concrete in use; e.g., infrastructures, highways.

It is also known in the art to make light weight concretes (LWC), which are comprised of hollow spheres and formulated to have densities generally below 1.5 g/cm$^3$, in contrast to most widely used concretes having densities above 2 g/cm$^3$. In these materials, low density is achieved by using high volume fractions of low density fillers like hollow spherical elements, generally at least about 25 vol. % (irrespective of whether light weight hollow elements/fillers are organic, inorganic, polymeric, metallic, hybrid or combinations thereof).

Although volume fraction is the most important parameter affecting the density of LWC, often the amount of hollow elements/fillers in LWC is reported in weight percentage. The weight fraction of hollow elements can be calculated as follows:

Weight fraction=(volume fraction×true density of hollow element)/(density of LWC)

The weight fraction of hollow elements/fillers in LWC for reducing density of concrete is generally at least 2%.

Accordingly, there is a need for providing a concrete mix formulation that can produce wet concrete mixes having good workability, as compared to the workability of conventional freeze-thaw durable wet concrete mixes having 4-8% entrained air, and a resulting hardened concrete having improved compressive strength and good freeze-thaw durability, again as compared to the compressive strength and the freeze-thaw durability of hardened concrete obtained from conventional freeze-thaw durable wet concrete mixes having 4-8% entrained air.

SUMMARY OF THE INVENTION

In a first embodiment, the present invention is directed to a concrete mix for producing a freeze-thaw durable concrete, comprising cement, deformable solid elements, and optionally water, wherein said deformable solid elements are either included in said concrete mix in a dry state, or mixed with said cement at the time of preparing a wet concrete mix, are present at a level of less than or equal to about 2 vol % relative to the volume of said wet concrete mix or a green concrete or a subsequently hardened concrete formed therefrom, and have a maximum dimension of less than about 300 micrometers.

Preferably, the deformable solid elements are present at a level of less than or equal to about 1 vol %, or even less than or equal to about 0.6 vol % of the wet concrete mix or a subsequently hardened concrete formed therefrom. Likewise, the deformable solid elements have a maximum dimension of less than about 300 micrometers, preferably less than about 200 micrometers, or even less than about 100 micrometers, or even less than 70 micrometers.

Additionally, the concrete mix can contain sand and/or aggregates and conventional admixtures, including but not limited to one or more of retarders, accelerators, plasticizers, fillers, silica fumes, fly ash or other pozzolanic materials. However, AEAs are not included within the scope of the admixtures useful in the present invention.

Advantageously, the concrete mix has a total deformable volume of said deformable solid elements which is at least 9% of capillary pores volume, wherein the capillary pores volume is equal to volume of water in excess of 36% by weight of cement in wet concrete mix.

Accordingly, the total volume of said deformable elements is sufficient to accommodate expansion caused by water freezing in capillary pores of said subsequently hardened concrete during a freezing event.

Conveniently, the concrete mix can be formulated such that water is present at a water-to-cement weight ratio in said wet concrete mix of at least about 26%, or wherein the water-to-cement weight ratio in said wet concrete mix is at least about 36%, or even wherein the water-to-cement weight ratio in said wet concrete mix is from about 40% to about 50%.

In some embodiments, the deformable solid elements are hollow, and can be in the form of spheres or fibers, such as wherein said deformable solid elements are hollow spheres of materials selected from the group consisting of glass, ceramics, silica, polymers, and combination thereof. In a particularly advantageous embodiment, the deformable solid elements are cenospheres.

Alternatively, the deformable solid elements are fibers, such as polymeric fibers including polypropylene (PP) fibers and polyvinyl alcohol (PVA) fibers, and can even act as reinforcing fibers and contribute to the tensile strength of the green concrete or subsequently hardened concrete.

Another embodiment of the present invention is directed to a hardened concrete durable to cracking in a freeze-thaw environment, comprising the following components: cement, aggregates, admixtures, and deformable solid elements, wherein the total volume of said deformable solid elements is sufficient to accommodate expansion caused by water freezing in capillary pores of said hardened concrete during a freezing event, and the maximum dimension of said deformable solid elements is less than about 300 micrometers, wherein said hardened concrete has a density above about 1.5 g/cm$^3$.

According to this embodiment, it is preferable that the deformable solid elements are hollow, such as wherein the deformable solid elements are in the form of spheres or fibers.

Advantageously, the hardened concrete has a density from about 2 g/cm$^3$ to about 2.5 g/cm$^3$, or even a density greater than about 2.5 g/cm$^3$.

In another embodiment, the hardened concrete comprises deformable space for accommodating expansion caused by water freezing in capillary pores of a cement gel of said concrete during a freezing event, wherein said deformable space is less than or equal to about 2 vol % relative to the volume of the hardened concrete, such as less than or equal to about 1 vol %, or even less than or equal to about 0.6 vol % of said concrete.

DETAILED DESCRIPTION OF THE INVENTION

In the present application, the term "concrete" is applicable to cementitious matrix and articles of cementitious matrix in general here, including self-leveling concrete, precast concrete products, concrete products produced by various processes like concrete pipes produced by rotational casting, shotcreting/spraying. Also, the term cement refers to "Portland cement" in general.

In contrast to conventional freeze-thaw durable concretes, the concrete mix of the present invention is formulated to contain deformable solid elements to replace the void volume of 4-8% entrained air in the conventional wet concrete mixes, with all other concrete mix components being the same. When combined with water, the concrete mix according to the present invention offers (1) the same level of workability as a conventional wet concrete mix, and (2) a resulting hardened concrete having the same level of freeze-thaw durability, and even higher levels of compressive strength and other strength properties, like abrasion resistance, impact strength, toughness, and hence provides a higher level of overall durability as compared to conventional freeze-thaw durable concrete.

According to the present invention, a novel concrete mix for producing a freeze-thaw durable concrete is disclosed, which comprises at least cement and deformable solid elements, as will be described in more detail below. The deformable solid elements are either included in said concrete mix in a dry state, or mixed with said cement at the time of preparing a wet concrete mix, are present at a level of less than or equal to about 2 vol % relative to the volume of said wet concrete mix or a green concrete or a subsequently hardened concrete formed therefrom, and have a maximum dimension of less than about 300 micrometers.

The novel concrete mix can be in the dry form, as described above and packaged to ship, or can optionally include water to form a wet concrete mixture suitable for working and pouring. As such, those skilled in the art will recognize that the novel concrete mix of the present invention can be formulated on-site, during mixing of a wet concrete, by adding a suitable amount of deformable solid elements, as described herein. Likewise, the novel concrete mix of the present invention, wet or dry, can further include sand and/or aggregates, such as gravel or the like, and conventional admixtures, such as one or more of retarders, accelerators, plasticizers, fillers, silica fumes, fly ash or other pozzolanic materials.

Unlike earlier efforts at formulating lightweight, low density concrete by mixing large quantities of hollow spheres with the other components of a concrete mix, the volume of deformable solid elements added to a concrete mixture according to the present invention, herein additionally referred-to as the "deformable volume", is limited to be just sufficient for accommodating expansion caused by water freezing in capillary pores of a cement gel of said concrete during a freezing event. Thus, the 4-8% entrained air volume of conventional freeze-thaw durable concrete mixes is replaced by deformable solid elements according to the present invention. Advantageously, the variability of deformable solid element dimensions and dimension distributions is selectable and controllable, in contrast to the air bubble dimensions and distributions in conventional freeze-thaw durable concrete. The characteristics of the deformable solid elements according to the present invention are controlled in their manufacturing; e.g., maximum dimension, void fraction.

The deformable solid elements can be in the form of spheres or fibers, such as wherein said deformable solid elements are hollow spheres of materials selected from the group consisting of glass, ceramics, silica, polymers, and combinations thereof. For example hollow glass microspheres, Styles S22, S15, K1, K15, manufactured by 3M™ Corporation of St. Paul, Minn., have desired physical dimensions (90% of hollow spheres having outer diameters less than 65, 90, 105 and 115 micrometers for Styles S22, S15, K15 and K1 respectively; 50% of hollow spheres smaller than about 60 micrometers; void fraction +90% for above mentioned hollow spheres styles) and low crushing strength of about 250-400 psi (well below 1000 psi tensile strength of cement gel), and thus, are good candidates for use in novel concrete mixtures per this invention. Style S22 can be effective for water-to-cement weight ratios of 40-60% when used at volume fractions at least equal to or greater than the lowest feasible for water-to-cement ratios 60%, 50% and 40% (volume fraction of Items 4A, 10A and 18A respectively), as shown in Table 1A. Said 3M™ hollow glass spheres Styles S22, S15, K15 and K1 have about 50% of spheres smaller than about 60 micrometers and are suitable over water-to-cement ratios from 40-60% in producing freeze-thaw durable concrete per this invention.

Another example of solid hollow glass, ceramic spheres having rigid walls and suitable for use in the novel concrete mixes of this invention is cenospheres, which are hollow ceramic particles; by-products of coal burning power plants.

Alternatively, when in the form of fibers, they can be hollow fibers, wherein the fibers have aspect ratios of at least about 5, reasonable tensile strength and suitable surface area for enhancing mechanical and/or chemical anchoring to surrounding cement gel, so that the deformable fibers can contribute to tensile strength-related product attributes of the concrete matrix (including green concrete; a wet concrete mix during early stages of curing), in addition to making the resulting hardened concrete freeze-thaw durable.

The deformable solid hollow elements useful in the present invention can be comprised of organic materials, polymeric materials, for example polyvinyl alcohol (PVA), polypropylene (PP), polyethylene (PE), nylon, polyester (PET), polyamide, acrylic; or inorganic materials, such as glass, ceramic, silica, metals like iron/steel, or hybrids or combinations thereof. PVA (and modified PVA with various functional groups) offers very good adhesion to cement gel due to its chemistry and can be helpful as deformable solid hollow fibers in contributing to tensile strength-related properties of concrete matrix, in addition to freeze-thaw durability.

Additionally, the solid deformable hollow elements (spheres, fibers, any shape) can be mono-component or bi-component (sheath-core type; e.g., core comprised of compressible foam, hydrophobic core and hydrophilic sheath). The term "hollow" refers to a deformable space of significantly low density, such as gases or air, in general, but is not limited to being entirely empty. For example, a low density, easily compressible foam could comprise the "hollow" space, surrounded by a higher density shell or the like. Here, the phrase "fiber shape" refers to a non-spherical shape having a high aspect ratio, preferably at least about 5, and is also applicable to fibers having non-circular cross section and film-like shapes having finite thickness, length and width.

In the case of deformable solid elements comprised of inner deformable spaces and outer solid shells in contact with surrounding cement gel (for example, solid hollow elements like solid hollow spheres or solid hollow fibers), the outer shell should be flexible enough under freezing conditions to allow inner deformable spaces to be deformed and to accommodate expansion caused by freezing water in the capillary pores of the cement gel. Accordingly, when the outer shell is polymeric, if the glass transition temperature of the polymer material is above ambient temperature (e.g., above 25° C.), the outer shell is rigid even at ambient conditions. Deformable solid hollow elements having rigid walls at ambient or freezing temperatures are discussed below.

In the case of solid hollow elements having rigid walls (comprised of organic polymeric materials, inorganic materials, metallics, hybrids or combination therein), the rigid walls become flexible by chemical and/or physical interactions, weaken, disintegrate and/or are eliminated during the curing period of the wet concrete mix, and/or during the first freezing event. For example, in the case of hollow glass spheres being used as deformable solid hollow elements in a wet concrete mix per this invention, the crushing strength of hollow glass spheres should be well below 1000 psi (i.e. the tensile strength of the cement gel), so that the glass walls get crushed during the first freezing event. Alternatively, since some glass formulations can be chemically attacked by the highly alkaline (pH>13) liquid phase conditions of hydrating cement, thin walls of such glass spheres are likely to be weakened, disintegrated, and/or absorbed by the hydrating cement phase during curing. The latter allows some margin for increasing the wall thickness of hollow glass spheres if needed for stability of the spheres during mixing steps (by using an appropriate glass composition that disintegrates during curing).

In contrast to conventional LWC, the freeze-thaw durable concrete per this invention incorporates a volume of deformable solid hollow elements/spheres below about 2 vol. %, more preferably below about 1 vol. % and most preferably below about 0.6 vol. %, relative to the volume of said wet concrete mix or a subsequently hardened concrete formed there from, an order of magnitude lower than the amount of hollow elements used as fillers in LWC for reducing density of concrete, and the weight fraction is a maximum of 0.2%, and as low as 0.01%, as shown in Table 1A, again an order of magnitude lower than the hollow spheres used as fillers in LWC for reducing density of concrete. The density of concretes of Table 1 and Table 1A is 2.3 g/cm$^3$. The deformable solid elements can either be included in the dry concrete mix, or mixed with the remaining components at the time of preparing a wet concrete mix.

Likewise, the deformable solid elements can have a maximum dimension of less than about 300 micrometers, preferably less than about 200 micrometers, or even less than about 100 micrometers, or even less than about 70 micrometers. The term "maximum dimension" as used herein refers to the diameters of the spheres or fibers used herein.

When properly formulated according to the present invention, the resulting hardened concrete will have a density above about 1.5 g/cm$^3$, such as from about 2 g/cm$^3$ to about 2.5 g/cm$^3$, similar to most widely used concretes, or even a density greater than about 2.5 g/cm$^3$.

In the case of high density concretes, like high strength concrete having low permeability produced using silica fumes with cement, wherein the water-to-cement ratio is low, generally below about 40% (i.e. having a very low level of water in excess of that needed for hydration of the cement, generally about 36%) low levels of deformable solid elements can be added to a wet concrete mix according to this invention, as a precautionary measure against freeze-thaw events, without noticeably affecting the compressive strength of the concrete, an important concrete performance parameter for high strength concrete.

Typically, the cement component is a Portland cement. Various known in the art aggregates can be added to the concrete mixtures of the present invention for their known purposes. The type of cement, sand and aggregates used and suitable cement:sand:aggregates weight ratios depend on the desired strength properties of the hardened concrete and its intended end-use application. The most widely used cement:sand:aggregates weight ratio for conventional concrete is 1:2:3. The novel wet concrete mix can be comprised of Portland cement, sand, aggregates, admixtures (like retarders, accelerators, plasticizers, silica fumes, fly ash and other pozzolanic materials), water and deformable solid elements. Said deformable solid elements of finite controlled dimension are uniformly mixed with dry concrete mix and/or with wet concrete mix at the time of preparing wet concrete mix.

Likewise, various admixtures can be added to the presently disclosed freeze-thaw durable cement mixture, for their known properties, such as retarders, accelerators, plasticizers, silica fumes, fly ash and other pozzolanic materials, and combinations of these.

However, unlike the conventional freeze-thaw durable concretes described above, AEAs comprised of wetting agents, surfactants and/or foaming agents, are not used in the presently disclosed wet concrete mix for the purpose of freeze-thaw durability. In other words, the freeze-thaw concrete mix of the present invention is or can be devoid of such AEAs, as described above.

Depending on the nature of the deformation, deformation of individual deformable solid elements may lead to multiple deformable spaces/elements during a first freezing event and/or over periods of repeated freeze-thaw cycles; e.g., deformable hollow spheres with rigid walls, as discussed above.

As an illustration, the physical dimensions of the most preferred embodiments, i.e. deformable solid hollow spheres and deformable solid hollow fibers used in the novel wet concrete mix, are estimated as follows. Estimates are based on following assumptions:
  (1) the thickness of the cement gel between adjacent hollow elements in a resulting hardened concrete matrix is a maximum of 200 micrometers,
  (2) the void space of the hollow elements is at least equal to increase in volume (9%) of water freezing in the capillary pores of the cement gel of a concrete matrix,
  (3) all of the hollow elements are of the same dimension, and are uniformly distributed in the cement gel,
  (4) the volume of the cement gel corresponds to the volume of solid cement plus the volume of water, and
  (5) the capillary pores volume of cement gel corresponds to volume of water in excess of 36% by weight of cement.

Assumption No. 1 is based on the fact that freezing water expanding in capillary pores can travel up to 550 micrometers in the capillary pores without exceeding the tensile strength of cement gel (1000 psi). Assumption No. 3, for simplicity, assumes that the hollow spheres are to be situated as the corners of cubes in the cement gel. Using an XYZ perpendicular coordinate axis, hollow fibers are situated in layers in the cement gel, wherein each layer is situated in XY plane and wherein said layers are spaced along Z direction, and wherein adjacent layers are separated by 200 micrometers in Z-direction. Additionally, it is assumed that each layer of fibers are spaced end-to-end and side-by-side by 200 micrometers and all fibers in a layer are aligned in the X direction and in the Y direction in adjacent layers. The Goal Seek function of Microsoft Excel workbook was used to make the various estimates of IDmin and ODmax as set forth herein.

Estimated physical dimensions of hollow spheres are reported in Table 1 for most widely used water-to-cement weight ratios of 0.4-0.6 and cement gel volume fraction of 0.25-0.32 in concrete matrix. The physical dimensions of solid hollow elements shown in Table 1 are estimates based on above described assumptions. The estimated physical dimensions and loadings (weight of solid hollow elements per unit volume of concrete) in concrete as shown in Table 1 are for illustration purposes only and are in no manner meant to be limiting as to the scope and/or spirit of the invention.

TABLE 1

| Ex. # | Concrete Water to Cement (wt. ratio) | Cement gel (vol. fraction) | Hollow spheres in Concrete Vol. fraction, (%) | Wt. fraction, (%) | Loading, (kg/m³) | Hollow spheres ODmax, (μm) | IDmin, (μm) | Surface Area, (mm²/mm³) | Void Fraction |
|---|---|---|---|---|---|---|---|---|---|
| 1 | 0.6 | 0.32 | 2 | 1.25 | 28.65 | 193.9 | 140.1 | 30.94 | 0.38 |
| 2 | 0.6 | 0.32 | 1 | 0.25 | 5.69 | 128.3 | 116.7 | 46.77 | 0.75 |
| 3 | 0.6 | 0.32 | 0.9 | 0.15 | 3.38 | 121.2 | 114.2 | 49.50 | 0.84 |
| 4 | 0.6 | 0.32 | 0.85 | 0.10 | 2.25 | 117.6 | 112.9 | 51.02 | 0.88 |
| 5 | 0.6 | 0.32 | 0.6 | | | | | | |
| 6 | 0.5 | 0.29 | 2 | 1.56 | 35.90 | 209.5 | 126.4 | 28.64 | 0.22 |
| 7 | 0.5 | 0.29 | 1 | 0.56 | 12.90 | 136.7 | 103.9 | 43.89 | 0.44 |
| 8 | 0.5 | 0.29 | 0.8 | 0.36 | 8.29 | 121 | 99.1 | 49.59 | 0.55 |
| 9 | 0.5 | 0.29 | 0.6 | 0.16 | 3.70 | 104.2 | 93.9 | 57.58 | 0.73 |
| 10 | 0.5 | 0.29 | 0.5 | 0.06 | 1.39 | 95.1 | 91.1 | 63.09 | 0.88 |
| 11 | 0.5 | 0.29 | 0.4 | | | | | | |
| 12 | 0.4 | 0.25 | 2 | 1.87 | 43.12 | 229.4 | 91.1 | 26.16 | 0.06 |
| 13 | 0.4 | 0.25 | 1 | 0.87 | 20.12 | 147.3 | 73.7 | 40.73 | 0.13 |
| 14 | 0.4 | 0.25 | 0.6 | 0.47 | 10.92 | 111.4 | 66.1 | 53.86 | 0.21 |
| 15 | 0.4 | 0.25 | 0.4 | 0.27 | 6.32 | 90.9 | 61.7 | 66.01 | 0.31 |
| 16 | 0.4 | 0.25 | 0.2 | 0.07 | 1.71 | 66 | 56.5 | 90.91 | 0.63 |
| 17 | 0.4 | 0.25 | 0.15 | 0.02 | 0.57 | 58.2 | 54.8 | 103.09 | 0.83 |
| 18 | 0.4 | 0.25 | 0.14 | 0.02 | 0.35 | 56.5 | 54.4 | 106.19 | 0.89 |
| 19 | 0.4 | 0.25 | 0.13 | | | | | | |

NOTE 1:
"ODmax"—outer diameter (maximum), "IDmin"—inner diameter (minimum)
NOTE 2:
Hardened/cured Concrete density 2.3 gms/cm³
NOTE 3:
Density of solid glass 2.3 gms/cm³

Examples 1A-19A of Table 1A, below, are derived from corresponding Examples 1-19 of Table 1 by increasing the inner diameters (IDmin) of the hollow spheres to values corresponding to a void fraction of 0.9. Increasing the ID from a minimum value (IDmin) increases the void space beyond the minimum estimated value (excess void space is beneficial) and reduces the wall thickness of the hollow spheres, and thus reduces the true density and weight of the hollow spheres in concrete for given volume fraction of hollow spheres. Reduced wall thickness (thin walls) is also helpful in reducing crushing strength (compressive strength) of hollow spheres having rigid walls to values much lower than the tensile strength of cement gel (which is generally about 1000 psi). However, it is important that the rigid walls are not so thin/weak that they could be destroyed in the mixing process during preparation of a dry or wet mix, prior to the hollow spheres getting situated in place in the wet concrete mix and prior to curing.

Additionally as to Tables 1 and 1A below, for deformable solid hollow spheres having 90% hollowness (void fraction), the estimated volume fraction of deformable elements can be as low as 0.9% and 0.14% for water-to-cement ratios of 0.6 and 0.4 respectively, and the corresponding maximum outer diameter of the hollow spheres is about 120 micrometers and 60 micrometers, respectively. These volume fractions and dimensions of the deformable solid elements are an order of magnitude smaller than entrained air bubbles using AEAs for freeze-thaw durable concrete.

TABLE 1A

| Ex. # | Concrete Water to Cement (wt. ratio) | Cement gel (vol. fraction) | Hollow spheres in Concrete Vol. fraction (%) | Wt. fraction (%) | Loading (kg/m³) | Hollow spheres ODmax (μm) | ID (μm) | Surface Area (mm²/mm³) | Void fraction |
|---|---|---|---|---|---|---|---|---|---|
| 1A | 0.6 | 0.32 | 2 | 0.20 | 4.60 | 193.9 | 187.2 | 30.94 | 0.90 |
| 2A | 0.6 | 0.32 | 1 | 0.10 | 2.30 | 128.3 | 123.9 | 46.77 | 0.90 |
| 3A | 0.6 | 0.32 | 0.9 | 0.09 | 2.07 | 121.2 | 114.2 | 49.50 | 0.90 |
| 4A | 0.6 | 0.32 | 0.85 | 0.09 | 1.96 | 117.6 | 112.9 | 51.02 | 0.90 |
| 5A | 0.6 | 0.32 | 0.6 | | | | | | |
| 6A | 0.5 | 0.29 | 2 | 0.20 | 4.60 | 209.5 | 202.3 | 28.64 | 0.90 |
| 7A | 0.5 | 0.29 | 1 | 0.10 | 2.30 | 136.7 | 132.0 | 43.89 | 0.90 |
| 8A | 0.5 | 0.29 | 0.8 | 0.08 | 1.84 | 121 | 116.8 | 49.59 | 0.90 |
| 9A | 0.5 | 0.29 | 0.6 | 0.06 | 1.38 | 104.2 | 100.6 | 57.58 | 0.90 |
| 10A | 0.5 | 0.29 | 0.5 | 0.05 | 1.15 | 95.1 | 91.8 | 63.09 | 0.90 |
| 11A | 0.5 | 0.29 | 0.4 | | | | | | |
| 12A | 0.4 | 0.25 | 2 | 0.20 | 4.60 | 229.4 | 221.5 | 26.16 | 0.90 |
| 13A | 0.4 | 0.25 | 1 | 0.10 | 2.30 | 147.3 | 142.2 | 40.73 | 0.90 |
| 14A | 0.4 | 0.25 | 0.6 | 0.06 | 1.38 | 111.4 | 107.6 | 53.86 | 0.90 |
| 15A | 0.4 | 0.25 | 0.4 | 0.04 | 0.92 | 90.9 | 87.8 | 66.01 | 0.90 |
| 16A | 0.4 | 0.25 | 0.2 | 0.02 | 0.46 | 66 | 63.7 | 90.91 | 0.90 |
| 17A | 0.4 | 0.25 | 0.15 | 0.02 | 0.35 | 58.2 | 56.2 | 103.09 | 0.90 |
| 18A | 0.4 | 0.25 | 0.14 | 0.01 | 0.32 | 56.5 | 54.6 | 106.19 | 0.90 |
| 19A | 0.4 | 0.25 | 0.13 | | | | | | |

Each Example of Tables 1 and 1A produces a concrete matrix having a thickness of cement gel between hollow spheres no greater than about 200 micrometers and provides needed space for accommodating expansion of freezing water in the capillary pores without allowing a pressure build-up in the capillary pores exceeding 1000 psi (the tensile strength of cement gel), and thus offers a recipe for producing a novel freeze-thaw durable concrete according to the present invention. As shown in Tables 1 and 1A, the volume fraction of deformable hollow spheres can be as low as 0.9 for a water-to-cement weight ratio 0.6 (high), or as low as 0.5 for a water-to-cement ratio 0.5 (moderate), or even as low as 0.15 for a water-to-cement ratio 0.4 (low). These volume fractions of deformable hollow spheres in concrete are an order of magnitude smaller compared to using 4-8% entrained air by volume to form capillary pores in concrete for freeze-thaw durability. The maximum dimension of deformable hollow spheres can be as low as 70 micrometers, which is an order of magnitude smaller than air bubbles as large as 1000 micrometers in case of entrained air using AEAs in wet concrete mix, discussed above.

For each Example of Tables 1 and 1A, deformable hollow spheres of smaller dimensions than ODmax (same void fraction) when used at the same volume fraction lowers the thickness of the cement gel between the hollow spheres to below about 200 micrometers, which is likely to be very helpful in making the concrete more freeze-thaw durable.

The estimated value of outer diameter of the deformable hollow spheres reported in Table 1 is based on assumption of all spheres are of same dimension and uniformly distributed in cement gel. The required loading can be more than estimated if the hollow glass spheres are not uniformly distributed in wet concrete mix. As discussed above, glass having an appropriate chemical composition can be chemically attacked by the highly alkaline (pH>13) liquid phase of hydrating cement, and hence 3M™ hollow glass microspheres that have heavier wall thickness (e.g., Styles S32, S35, K37 where initial crushing strength is above 1000 psi, void fraction about 85%, 50% of hollow spheres less than about 50 micrometers in dimension) that are still within estimated physical dimensions as shown in Table 1A can be made suitable with the above described proper decomposable glass desired to be screened out in view of the desired void and wall thicknesses for suitability of hollow spheres per this invention.

As illustrated in Tables 1 and 1A, the volume fraction of hollow glass spheres in the novel freeze-thaw durable concrete is from about 0.1-1%, as compared to the volume fraction of entrained air of about 4-8% in conventional freeze-thaw durable concrete. In addition, the dimensions of hollow glass spheres is an order of magnitude smaller than corresponding air bubbles of entrained air-based conventional freeze-thaw durable concrete. The maximum dimensions of the hollow glass microspheres can be controlled to be about 200 micrometers, as compared to air bubbles as large as 1000 micrometers for entrained air.

Thus, resulting novel concrete matrix, in addition to having good freeze-thaw durability, can also exhibit enhanced compressive strength and other strength-related properties of a concrete matrix (like abrasion resistance, impact strength, toughness) that are currently negatively affected by the presence of large entrained air bubbles in large quantities. If the novel concrete mix is also formulated to contain conventional reinforcing fibers for structural value in a concrete matrix, the full potential of reinforcing fibers can be realized due to absence of large quantities of entrained air in the form of large air bubbles, resulting in a novel freeze-thaw durable, fiber-reinforced concrete matrix, having step increases in key strength properties like abrasion resistance, impact strength, toughness, as compared to conventional fiber reinforced concrete containing 4-8% by volume entrained air for freeze-thaw durability. This is of significant value in applications like infrastructures, such as highways.

Table 2 illustrates various attributes of hollow fibers suitable for formulating the freeze-thaw durable concrete of the present invention. Considering current manufacturing capabilities for hollow fibers production, it is preferred to keep the void fraction of hollow fibers to less than 60%, preferably less 40%, more preferably less than 30%, and fiber dimensions (outer diameter) greater than 10 micrometers (+1 denier for resins like PP, PET, PVA). For cost effectiveness, it is preferred to keep the physical dimensions of hollow fibers for use in this invention within current manufacturing practices for hollow fibers, and the required hollow fiber loading in concrete as low as feasible.

TABLE 2

| | Concrete | | Hollow fibers in Concrete | | | Hollow fibers | | | | |
|---|---|---|---|---|---|---|---|---|---|---|
| Ex. # | Water to Cement (wt. ratio) | Cement gel (vol. fraction) | Vol. fraction, (%) | PP hollow fibers, (kg/m³) | PVA hollow fibers (kg/m³) | ODmax (µm) | IDmin (µm) | Length (cm) | Surface Area (mm²/mm³) | Void fraction |
| 20 | 0.40 | 0.25 | 0.28 | 1.40 | 2.00 | 27.30 | 18.30 | 2.00 | 146.52 | 0.45 |
| 21 | 0.40 | 0.25 | 0.40 | 2.49 | 3.56 | 33.50 | 18.80 | 2.00 | 119.40 | 0.31 |
| 22 | 0.40 | 0.25 | 0.50 | 3.40 | 4.86 | 38.20 | 19.20 | 2.00 | 104.71 | 0.25 |
| 23 | 0.45 | 0.27 | 0.60 | 2.88 | 4.12 | 40.90 | 28.10 | 2.00 | 97.80 | 0.47 |
| 24 | 0.45 | 0.27 | 0.80 | 4.70 | 6.72 | 48.90 | 29.10 | 2.00 | 81.80 | 0.35 |
| 25 | 0.45 | 0.27 | 1.00 | 6.52 | 9.32 | 56.20 | 29.90 | 2.00 | 71.17 | 0.28 |
| 26 | 0.50 | 0.29 | 1.50 | 9.64 | 13.77 | 70.30 | 38.10 | 2.00 | 56.90 | 0.29 |

NOTE 1:
"ODmax"—outer diameter (maximum), "IDmin"—inner diameter (minimum)

NOTE 2:
Hardened/cured Concrete density 2.3 gms/cm³

NOTE 3:
Density of PP (Polypropylene) 0.91 gms/cm³; Density of PVA 1.3 gms/cm³

(in case heavier wall thickness is desired for stability of hollow glass spheres during mixing). Deformable hollow spherical elements smaller than 10 micrometers may be The novel concrete mix of the present application may comprise mixtures of various different deformable elements (shape, dimension, make-up). Minor variations like the use of very low levels of entrained air, such as less than about 1 vol %, along with the deformable elements in wet concrete mix per this invention is within the spirit/scope of this invention. As discussed above, the deformable solid elements can be added to a dry concrete mix and/or a wet concrete mix. Dry concrete mix composition is same as wet concrete mix excluding water if deformable solid elements are added to wet concrete mix. Since the volume of resulting hardened concrete is almost same as wet concrete mix, parameters like volume fraction and the spacing of solid deformable elements in wet concrete mixes, are essentially equivalent for hardened concrete as well.

Unless otherwise specified, the meanings of terms used herein shall take their ordinary meaning in the art. In addition, all patents and patent applications, test procedures (such as ASTM methods or the like), and other documents cited herein are fully incorporated by reference to the extent such disclosure is not inconsistent with this invention and for all jurisdictions in which such incorporation is permitted. Also, when numerical lower limits and numerical upper limits are listed herein, ranges from any lower limit to any upper limit are contemplated. Note further that Trade Names used herein are indicated by a ™ symbol or ® symbol, indicating that the names may be protected by certain trademark rights, e.g., they may be registered trademarks in various jurisdictions.

The invention has been described above with reference to numerous embodiments and specific examples. Many variations will suggest themselves to those skilled in this art in light of the above detailed description. All such obvious variations are within the full intended scope of the appended claims.

I claim:

1. A hardened concrete resistant to cracking in a freeze-thaw environment, comprising the following components:
   cement;
   aggregates;
   optionally admixtures; and
   deformable spaces containing physical or chemical remnants of inorganic disintegrated solid elements,
   wherein the total volume of said deformable spaces is less than 2%, and the maximum dimension of said deformable spaces is less than about 300 micrometers, and the distance between the deformable spaces is no greater than about 200 micrometers, so as to prevent a pressure build-up in capillary pores of cement gel exceeding 1000 psi upon freezing of water within the capillary pores, said hardened concrete having a density above about 1.5 $g/cm^3$.

2. The hardened concrete of claim 1, wherein said deformable spaces contain physical or chemical remnants of inorganic, hollow, spherical, deformable solid elements.

3. The hardened concrete of claim 2, wherein said inorganic deformable solid elements are made of materials selected from the group of glass, ceramic and silica and combinations thereof.

4. The hardened concrete of claim 2, wherein said spheres have a crush strength of <1000 psi.

5. The hardened concrete of claim 3, wherein said inorganic deformable solid elements are cenospheres.

6. The hardened concrete of claim 3, wherein said inorganic deformable solid elements are deformed by chemical disintegration over time.

7. The hardened concrete of claim 6, wherein said inorganic deformable solid elements are glass spheres.

8. The hardened concrete of claim 1, which has a density of above about 2 $g/cm^3$.

9. The hardened concrete of claim 1, which has a density of above about 2.5 $g/cm^3$.

10. The hardened concrete of claim 1, which has a density from about 2 $g/cm^3$ to about 2.5 $g/cm^3$.

11. The hardened concrete of claim 1, wherein the total volume of said deformable spaces is less than about 1%.

12. The hardened concrete of claim 1, wherein the total volume of said deformable spaces is less than or equal to about 0.6%.

* * * * *